United States Patent Office 3,669,583
Patented June 13, 1972

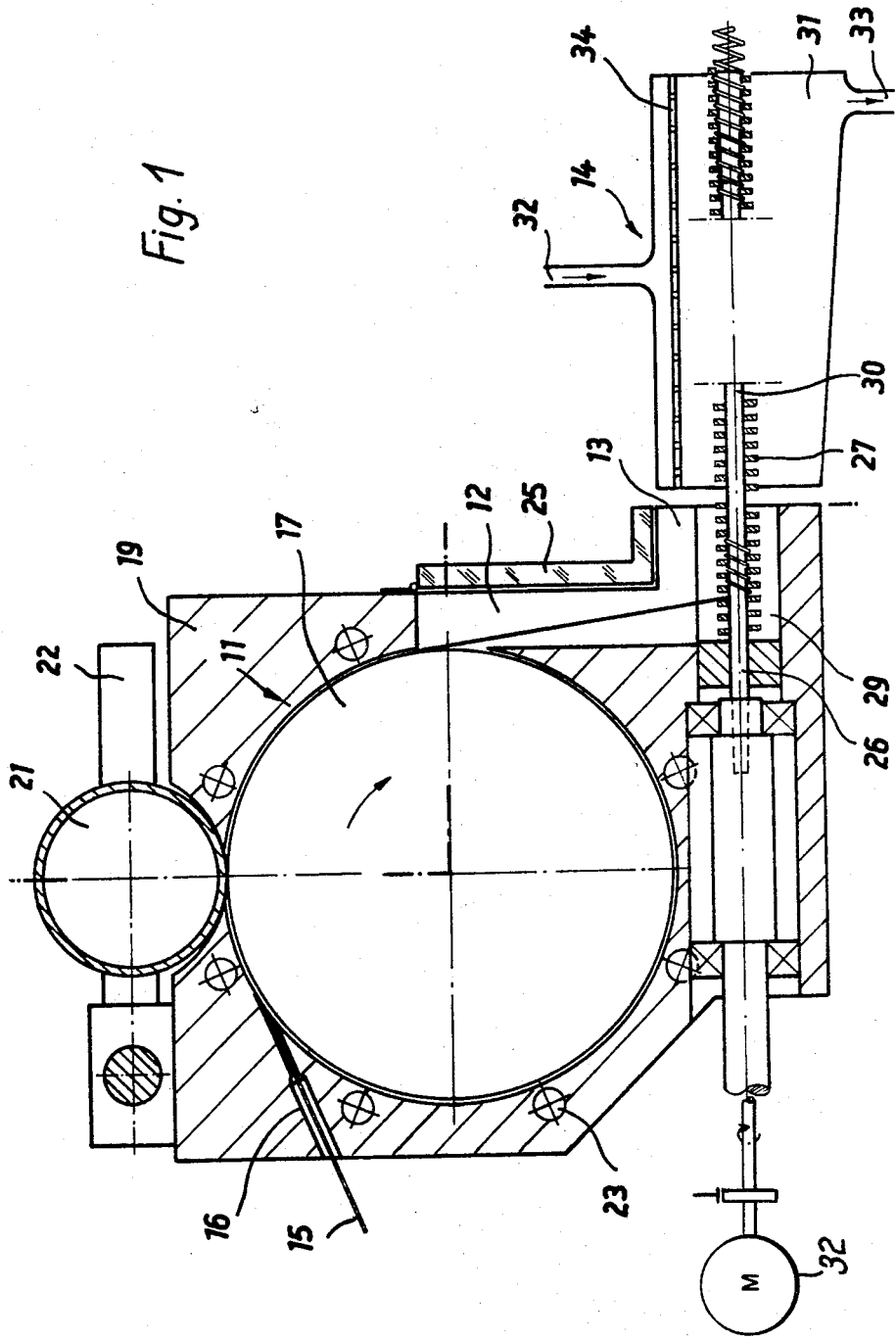

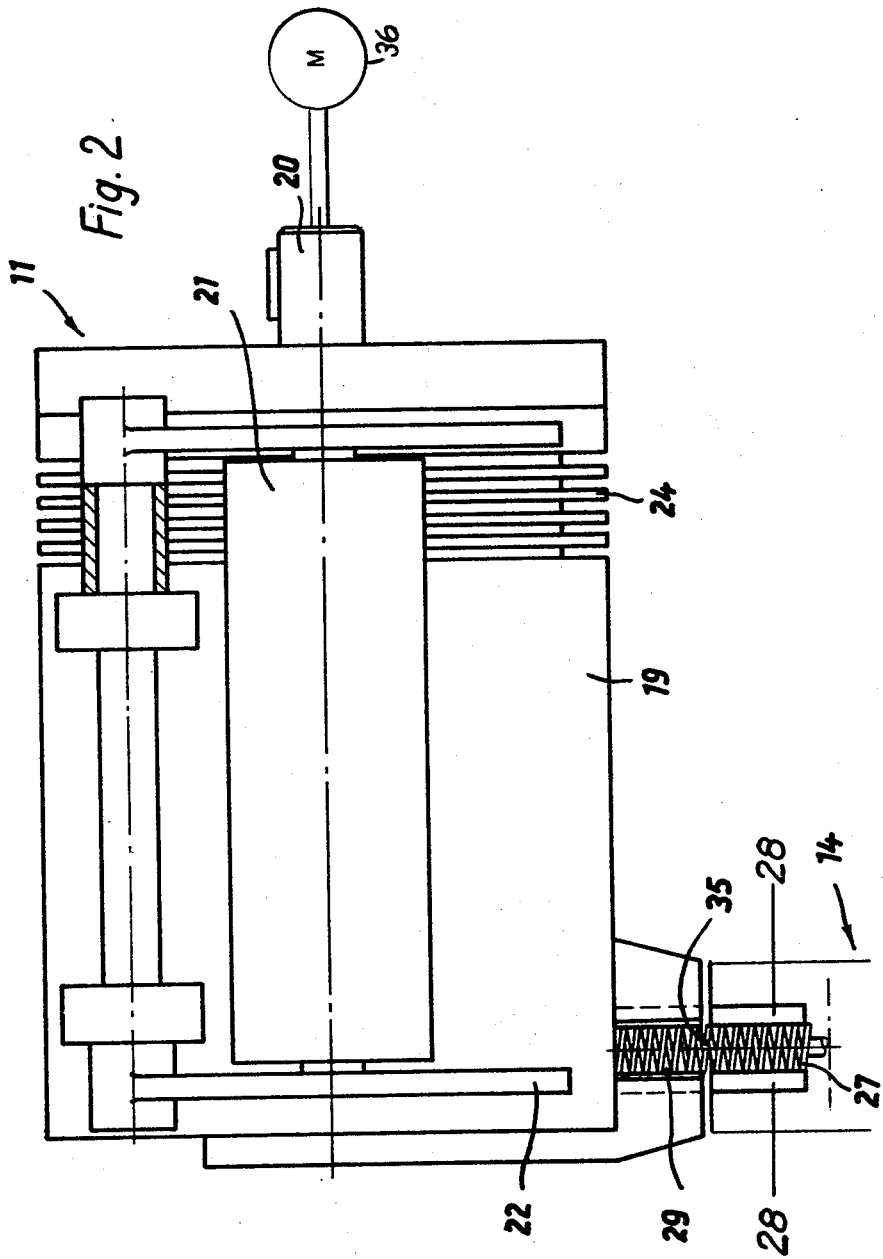

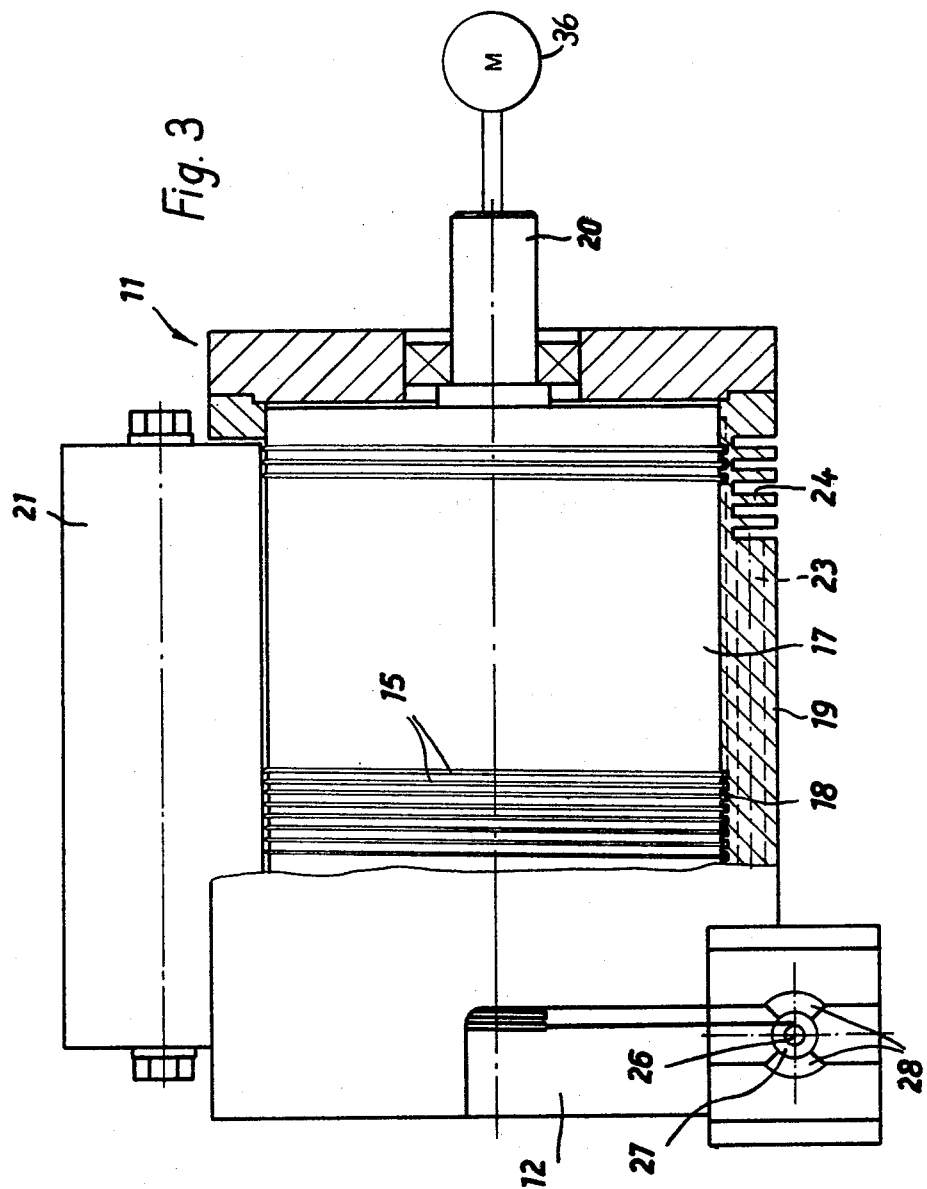

3,669,583
APPARATUS FOR MANUFACTURING SPIRALS FROM THREADS OF SYNTHETIC THERMOPLASTICS MATERIAL
Guido Negro, Neuffen, Germany, assignor to Bielomatik Leuze & Co.
Filed Aug. 31, 1970, Ser. No. 68,168
Claims priority, application Germany, Sept. 2, 1969, P 19 44 371.1-16
Int. Cl. B29c 17/00
U.S. Cl. 425—214    10 Claims

ABSTRACT OF THE DISCLOSURE

This invention concerns an apparatus for manufacturing a spiral from a thread of synthetic thermoplastics material. The apparatus includes a housing defining a cylindrical chamber having a drum rotatably mounted therein for continuous rotation. As distinct from prior arrangements, the housing is heated and includes a spirally-shaped thread guide groove in the cylindrical surface of the chamber and the drum has a smooth surface.

---

The present invention relates to an apparatus for manufacturing spirals from threads of synthetic thermoplastics material.

An apparatus for continuously manufacturing plastics material spirals is already known. This apparatus includes a heated drum of relatively small diameter having spiral grooves cut therein, and has a continuously driven coiling mandrel and a driven pressure drum cooperating therewith together with a comb-like guide element. Thermoplastics thread cannot be heated satisfactorily in this known apparatus, since heating has to be carried out at a very high temperature owing to the short time available for heating, so that the exterior of the thread becomes almost adhesive, while its interior is too solid. Moreover processing can only be carried out continuously with this apparatus.

Thus, intermediate storage, and renewed feeding to a station in which the spirals are further processed, are necessary. Since such plastics material spirals are generally used for screwing into previously perforated rows of holes in a pad of sheets such as a shorthand pad or the like to spirally bind the pad, it would be desirable to be able to manufacture the spirals intermittently, by so doing it would be possible to mount the apparatus for manufacturing the spirals directly at a pad binding station of the machine for manufacturing the pads or the like.

Intermittent manufacture is not possible in the case of the known apparatus, since when continuous coiling operation is interrupted, the plastics material thread hardens again before it is coiled to form the spiral. Thus the spiral has a flaw at this point when the apparatus is put into operation again.

One object of the present invention is to provide an apparatus which has a substantially increased performance, and which is suitable for intermittently manufacturing synthetic plastics material spirals.

A further object of the invention is to provide an apparatus for manufacturing spirals which can be intermittently fed to a pad-binding station.

A still further object is to provide an apparatus for fitting to fully automatic machines for manufacturing spirally bound products such as pads, books, blocks or the like.

In accordance with the invention there is provided an apparatus for manufacturing a spiral from a thread of synthetic thermoplastics material which comprises a housing defining a cylindrical chamber and having an inlet at one end for receiving thread fed thereto wherein the improvement comprises heating means in said housing for plasticizing thermoplastics material thread, spirally-shaped thread guide groove in the cylindrical surface of said chamber and leading from said inlet, a drum having a smooth surface rotatably mounted in said chamber, first motor means for continuously rotating said drum, the spacing between the bottom of the guide grooves and the surface of the drum being greater than the thickness of the thread, a feed passage defined in the housing at the other end of the cylindrical chamber for receiving plasticized material from the guide groove in the housing, cooling means spaced from said housing and adjacent said feed passage, a rotatable mandrel having one part of its length within said feed passage and a second part of its length within said cooling means, second motor means intermittently driving said mandrel, fixed thread guide means located around said mandrel for spiralling plasticized material received from the feed passage whereby spiralled material passes along said guide means to said cooling means whereat said plasticized material is set into a spiral.

It has transpired that apparatus constructed in accordance with the invention exceeds the performance of the known apparatus almost 5-fold. Owing to the size of the drum of the heating device, the thread can be slowly and uniformly heated over a very long distance. By virtue of the invention, the large and heavy drum of the heating device can be driven continuously, since, when the conveying of the thread out of the heating device is interrupted owing to the intermittently driven coiling mandrel, the turns of the thread on the drum simply lift and the drum continues to run idle. Owing to the heating of the feed passage leading to the coiling tool and the heating of the first portion of the mandrel, there is no variation in the temperature of the thread when operation is interrupted. On the contrary, a certain portion of the thread has already been coiled to form the spiral, so that it may readily be conveyed further. It will be appreciated that this advantageous method of operation is rendered possible by the apparatus in which the individual parts are combined in the manner stated. By reason of the invention, it is possible for the heating device, the feed passage, and the first portion of the spindle to be arranged in a common, heated unit.

Furthermore, the invention enables the spiral-shaped thread guide device to allow the thread radial clearance on the mandrel and the end of the mandrel located in the feed direction to have a conically widened portion. Thus, the advantageous method of operation, which is possible in accordance with German patent specification 1,189,513, can now be used in the case of plastics material spirals. Accordingly, the spiral lifts from the coiling mandrel when the spiral encounters an obstruction such as an incompletely perforated hole during the screwing-in operation, so that the coiling mandrel runs idle and the spiral is not advanced. The following spiral is then not damaged during the interruption then occurring in the operation, which would otherwise be the case in the known apparatus for manufacturing plastics material spirals.

In accordance with a further feature of the invention, the thread guide device comprises a screw which is open across portions of its outer periphery and which is supported or carried by longitudinally extending holding members, the open portions forming passages for conducting a heat carrier. Preferably, two lateral bars are provided and support the open flat screw. A passage is formed between these two bars, through which the cooling water, which is preferably used, is conducted particularly to the cooling device. Thus, reliable and effective cooling is provided.

The invention will now be described further by way of example with reference to the accompanying drawings which illustrate one embodiment of the invention and in which:

FIG. 1 is a schematic section through an apparatus constructed in accordance with the invention;

FIG. 2 is a plan view of the apparatus illustrated in FIG. 1; and

FIG. 3 is a partially broken-away elevation of the apparatus, seen from the right in FIG. 1.

An apparatus according to the invention comprises the combination of a heating device shown generally as 11, a feed passage 12, a coiling device 13 and a cooling device shown generally as 14 as illustrated in FIG. 1.

A thread 15 made from synthetic thermoplastics or other plastics material is fed to the heating device 11 through an inlet feed passage 16. The thread 15 then runs around a drum 17 and is fed spirally to the heating device 11 in guide grooves 18 formed in the housing 19.

The drum 17 has a smooth surface and a very large diameter in comparison to the thickness of the thread and to the diameter of a coiling mandrel which is to be described later. In one construction of the apparatus, the drum is constructed to receive about 20 metres of plastics material thread. The drum 17 is driven continuously by a motor 36 through a drive shaft 20. The upper part of the housing 19 includes a longitudinal recess. A pressure roller 21, which is carried on a pivotable arm 22, can either by pressed against part of the surface of the drum 17, or against the threads located thereon, by way of the longitudinal recess.

The housing 19 is heated by a plurality of heating rod elements 23 which are arranged around the periphery of the drum and which are located in bores in the housing. In order to obtain uniform heating of the plastics material thread it is desirable that the thread is not immediately subjected to the full temperature of the heating device. For this reason the housing is provided with cooling fins 24 in the region of the inlet 16, which vanes provide a temperature drop at this location. Thus, it is possible to use simple heating rod elements which are uniformly heated across their entire length.

The housing 19 includes an outlet feed passage 12 at the opposite end of the drum 17 to the inlet feed passage 16. The feed passage 12 is in the form of a recess in the housing 19 and is closed outwardly by a hinged, preferably transparent cover 25. The thread runs in the outlet feed passage 12 to the coiling device 13 which includes a coiling mandrel 26 of relatively great length which is driven by a braking motor 37. A thread guide device 27 is arranged around the coiling mandrel and is in the form of a helical screw coiled from flat material. The screw is supported and held together by two lateral bars 28.

As may be seen particularly from FIG. 1, the front portion 29 of the coling device, i.e. the front portion of the mandrel and of the thread guide device, is arranged in the housing of the heating device, so that this portion 29 is still heated by the heating elements 23 and is not cooled. The coiling device 13 has a second portion 30 which extends from the heated housing 19 into the cooling device 14. The cooling device 14 consists of a chamber 31 which is provided with a coolant inlet 32 and a coolant outlet 33. Water or other coolant is pumped through the cooling device by way of the coolant inlet 32. Preferably, the coolant is circulated through the chamber 31. Preferably, a perforated screen 34 is mounted in the chamber 31 for the purpose of providing a uniform flow of water therein. The coolant is guided in the chamber 31 in such a manner that it flows through the separate turns of the thread guide device 27. The bars 28 prevent water from flowing around the thread guide device. Thus, the coolant is used to good advantage and a good and uniform cooling effect is obtained.

The mandrel 26 has a slightly conically widened portion in the region where it emerges from the cooling device 14, i.e. at its free end (to the right of FIG. 1 as viewed). The thread guide device 27 is provided with a correspondingly larger internal diameter in this region. This widening, and the fact that the thread can yield outwardly in the thread guide device 27, provides a margin of safety against damage to the spiral or to a pad of sheets to be bound in the event of stoppages in the discharge of the spirals. This margin of safety, which is described in detail in the German patent specification 1,189,513, is provided for since the spiral is untwisted in the event of a stoppage, i.e. its diameter is increased, so that the frictional connection between the spiral and the mandrel is reduced or eliminated and the mandrel turns freely without carrying along the spiral. It will be understood that the screw forming the thread guide device 27 is preferably broken between the front portion 29 and the second portion 30 of the thread guide device, i.e. in the region in which the mandrel emerges from the heated zone and enters the cooled zone, in order to prevent heat conduction between the two zones. The break 35 may be seen in FIG. 2 so that the only connection between the heating device 11 and the cooling device 14, is the driven coiling mandrel 26.

The apparatus constructed in accordance with the invention operates in the following manner:

To put the apparatus into operation, the pressure roller 21 is brought into engagement with the drum 17 by pivoting the arm 22, and a thread 15 is inserted into the inlet feed passage 16. The pressure roller 21 supplies the contact pressure required to guide the thread through the spiral-shaped guide grooves when the drum 17 is turned. When the thread has passed through the heating device, i.e. when it emerges from the feed passage 12 towards the coiling device, the pressure roller 21 is raised and the thread is no longer conveyed, irrespective of whether the drum continues to turn or not. An already coiled plastics material spiral is then placed onto the mandrel 26 from the right in FIG. 1 and is coiled onto the mandrel by driving the breaking motor in the opposite direction to the normal conveying direction. The end of the coiled spiral at the left in FIG. 1 is then connected by means of conventional welding tongs to the end of the thread located in the feed passage 12. The polarity of the brake motor is then changed again, and the apparatus is ready for operation.

During normal operation, the braking motor is driven at the number of revolutions corresponding to the desired length of the plastics material spiral. The end of the spiral on the right in FIG. 1 is then preferably simultaneously screwed into a previously perforated pad of sheets to bind them together. The pre-heated thread is thus fed from the drum 17. When the braking motor is switched off because the spiral has attained the required length, the spiral is cut to length and is bent to prevent its becoming unscrewed from the then bound pad of sheets. The mandrel 26 is stationary during this period. The drum 17 continues to turn because of its continuous drive, although the thread is not advanced since it is raised from the drum and the latter turns idly below the thread.

No flaws appear in the spiral during normal operation or during unforeseen interruptions in operation, since the thread always remains uniformly heated even when it enters the coiling device. In particular, the thread does not have to be re-threaded after an interruption in operation, since an adequate length of coiled spiral is always located on the heated portion of the mandrel.

Despite the great length of thread which the heating device can accommodate, the heating device itself is very compact and may be manufactured with small external dimensions. Since most of the other parts forming part of the entire apparatus are also arranged in the heating device, the apparatus may readily be mounted on a machine for carrying out further processing such as binding. However, the apparatus also has advantages of a thermic nature. The heating device needs to be heated only to the temperature necessary for plasticizing the thread, i.e. the temperature can be fully independent of the throughput of the thread. This is not the case in other apparatus, since equilibrium of temperature cannot be obtained at the exit of the thread owing to the short lengths of thread which can be located in the heating device at any given time. Thus, a control arrangement is required for varying operating conditions, a control device which may be omitted in the present invention. Thus, the material cannot be damaged by heat even when it remains in the heating device for a long period during an interruption in the operation of the apparatus. Furthermore, the plastics material thread is heated through to the core even at a high rate of throughput. The plasticizing of the thread through to the core without structural damage to the surface is also important in that otherwise too high stresses remain in the thread and uncontrollably influence and vary the required accuracy of the pitch and diameter of the spiral.

Whilst only one embodiment of the invention has been described herein, it will be understood to those skilled in the art that various modifications and variations of the invention may be resorted to without departing from the spirit and scope of the invention as set forth in the appended claims.

I claim:

1. An apparatus for manufacturing a spiral from a thread of synthetic thermoplastics material which comprises a housing defining a cylindrical chamber and having an inlet at one end for receiving thread fed thereto wherein the improvement comprises heating means in said housing for plasticizing thermoplastics material thread, spirally-shaped thread guide groove in the cylindrical surface of said chamber and leading from said inlet, a drum having a smooth surface rotatably mounted in said chamber, first motor means for continuously rotating said drum, the spacing between the bottom of the guide grooves and the surface of the drum being greater than the thickness of the thread, a feed passage defined in the housing at the other end of the cylindrical chamber for receiving plasticized material from the guide groove in the housing, cooling means spaced from said housing and adjacent said feed passage, a rotatable mandrel having one part of its length within said feed passage and a second part of its length within said cooling means, second motor means intermittently driving said mandrel, fixed thread guide means located around said mandrel for spiralling plasticized material received from the feed passage whereby spiralled material passes along said guide means to said cooling means whereat said plasticized material is set into a spiral.

2. Apparatus as set forth in claim 1 wherein said guide means allows the thread radial clearance on the mandrel and wherein a conically widened portion is provided at the end of the mandrel located in the feed direction.

3. Apparatus as set forth in claim 1 wherein the guide means comprises a screw which is open across portions of its outer periphery which open portions from passages for conducting a coolant, and wherein longitudinally extending holding members are provided supporting said screw.

4. Apparatus as set forth in claim 3 wherein the screw is broken in the space between said housing and said cooling means.

5. Apparatus as set forth in claim 1 wherein means are provided for circulating the coolant in said cooling means.

6. Apparatus as set forth in claim 5 wherein the coolant is water.

7. Apparatus as set forth in claim 1 wherein said heating means includes heating rod elements peripherally surrounding said cylindrical chamber and wherein external cooling fins are provided on said housing in the region of the inlet, for the thread.

8. Apparatus as set forth in claim 1 wherein a pressure roller is provided which is engageable with a thread abutting said drum when the thread is being plasticized.

9. Apparatus as set forth in claim 1 wherein said heating means, feed passage and said one part of said mandrel are combined in one heated unit.

10. Apparatus as set forth in claim 1 wherein said second motor means comprises a braking motor which is selectively drivable in either direction.

References Cited

UNITED STATES PATENTS

| 2,575,747 | 11/1951 | Cook | 264—281 X |
| 2,740,987 | 4/1956 | Moncrieff | 18—19 C X |

FOREIGN PATENTS

| 945,584 | 1/1964 | Great Britain | 18—19 C |

J. SPENCER OVERHOLSER, Primary Examiner

M. O. SUTTON, Assistant Examiner

U.S. Cl. X.R.

57—34 HS; 264—281; 425—391